United States Patent
Jeong et al.

(10) Patent No.: US 9,772,476 B2
(45) Date of Patent: Sep. 26, 2017

(54) GRADIENT INDEX LENS USING EFFECTIVE REFRACTIVE INDEX OF MICROSTRUCTURE ARRANGED IN RADIAL PATTERN, AND METHOD FOR MANUFACTURING SAME

(71) Applicant: KOREA ADVANCED INSTITUTE OF SCIENCE AND TECHNOLOGY, Daejeon (KR)

(72) Inventors: Ki-Hun Jeong, Daejeon (KR); Sang-Gil Park, Seoul (KR); Youngseop Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/372,047

(22) PCT Filed: Dec. 14, 2012

(86) PCT No.: PCT/KR2012/010910
§ 371 (c)(1),
(2) Date: Jul. 14, 2014

(87) PCT Pub. No.: WO2013/108994
PCT Pub. Date: Jul. 25, 2013

(65) Prior Publication Data
US 2015/0002927 A1    Jan. 1, 2015

(30) Foreign Application Priority Data

Jan. 20, 2012 (KR) .................. 10-2012-0006899

(51) Int. Cl.
*G02B 13/14* (2006.01)
*G02B 3/00* (2006.01)
(Continued)

(52) U.S. Cl.
CPC ............ *G02B 13/14* (2013.01); *B29C 45/372* (2013.01); *B29D 11/00028* (2013.01);
(Continued)

(58) Field of Classification Search
CPC .. G02B 5/0883; G02B 5/0891; G02B 3/0087; G02B 6/03616
(Continued)

(56) References Cited

U.S. PATENT DOCUMENTS 6,771,428 B2   8/2004   Ishikawa et al.
7,710,657 B2   5/2010   Hamada
(Continued)

FOREIGN PATENT DOCUMENTS

| | | |
|---|---|---|
| JP | 2002169085 | 6/2002 |
| JP | 2008236327 | 10/2008 |
| WO | 2006077889 | 7/2006 |

OTHER PUBLICATIONS

Jiao et al. (Designing for beam propagation in periodic and non-periodic photonic nanostructures: Extended Hamiltonian method, Physical review E 70, 036612, 2004).*

(Continued)

*Primary Examiner* — Stephone B Allen
*Assistant Examiner* — Travis Fissel
(74) *Attorney, Agent, or Firm* — STIP Law Group, LLC

(57) ABSTRACT

Provided are a gradient index lens using the effective refractive index of a microstructure operating in the terahertz frequency regions and mid-infrared regions at wavelengths of 0.8 m to 3 mm and a method for manufacturing the same. Based on the effective medium theorem, the effective refractive index is controlled by using a structure smaller than the mid-infrared and terahertz wavelength, and a gradient can be provided for the refractive index in a radial direction and in (Continued)

an axial direction. Thus, beams in the mid-infrared and terahertz frequency region can be converged.

11 Claims, 7 Drawing Sheets

(51) Int. Cl.
  *B29C 45/37* (2006.01)
  *B29D 11/00* (2006.01)
  *B29L 11/00* (2006.01)
(52) U.S. Cl.
  CPC ..... *G02B 3/0087* (2013.01); *B29L 2011/0016* (2013.01); *G02B 2207/107* (2013.01)
(58) Field of Classification Search
  USPC ...... 359/653, 652, 654; 348/59, 49; 427/515
  See application file for complete search history.

(56) References Cited

U.S. PATENT DOCUMENTS

| | | | |
|---|---|---|---|
| 2004/0027682 A1* | 2/2004 | Tsunetomo | G02B 3/0087 359/652 |
| 2006/0066775 A1* | 3/2006 | Toshikiyo | G02F 1/133526 349/95 |
| 2006/0068154 A1* | 3/2006 | Parce | B82Y 20/00 428/76 |
| 2009/0022464 A1* | 1/2009 | Hamada | G02B 6/1225 385/129 |
| 2010/0178018 A1* | 7/2010 | Augusto | G02B 6/12 385/131 |
| 2011/0164237 A1* | 7/2011 | Soer | B82Y 10/00 355/71 |

OTHER PUBLICATIONS

Ma et al. (Experiments on high-performance beam-scanning antennas made of gradient-index metamaterials, Applied Physics Letters 95, 094107 2009).*
Smith et al. (Gradient index metamaterials, Physical Review E 71, 036609, 2005).*
Flores-Arias et al. (Crossover interconnects in gradient-index planar optics, Optics Communications 266 (2006) 490-494).*
Mei et al. (Arbitrary bending of electromagnetic waves using isotropic materials, Journal of Applied Physics 105, 104913 2009).*
Mei et al. (Gradient index metamaterials realized by drilling hole arrays, Journal of Physics D: Applied Physics, Pub. Jan. 21, 2010.*
Mei et al. Gradient index metamaterials realized by drilling hole arrays, Journal of Physics D: Applied Physics, Pub. Jan. 21, 2010.*
International Search Report—PCT/KR2012/010910 dated Mar. 28, 2013.
Mei et al., Gradient index metamaterials realized by drilling hole arrays, J. Phys. D: Appl. Phys. 43, Jan. 21, 2010, IOP Publishing, English translation of article.
Sameshima et al., Analysis of Microwave Absorption Caused by Free Carriers in Silicon, Japanese Journal of Applied Physics 48, Feb. 20, 2009, 021204-1-021204-6, The Japan Society of Applied Physics, English translation of article.
Valentine et al., An optical cloak made of dielectrics, Nature Materials, vol. 8, 568-571, Apr. 29, 2009, Macmillan Publishers Limited, English translation of article.

* cited by examiner (a)

(b)

(c)

(d)

GRADIENT INDEX LENS USING EFFECTIVE REFRACTIVE INDEX OF MICROSTRUCTURE ARRANGED IN RADIAL PATTERN, AND METHOD FOR MANUFACTURING SAME

TECHNICAL FIELD

The present invention relates to a gradient index lens using an effective refractive index of a microstructure, and more particularly, to a gradient index lens operated in a mid-infrared region to a terahertz frequency region and a method for manufacturing the same.

BACKGROUND ART

An electromagnetic wave from mid-infrared to terahertz wave (THz wave) is defined as an electromagnetic wave having a wavelength of 3 μm to 3 mm. Recently, optical devices operated in these wavelength regions have been actively developed.

The lens is the most basic optical device which converge beams and has been essentially used in various optical systems.

As a lens used to converge the mid-infrared and the terahertz wave, there are, for example, a parabolic mirror, a silicon lens, a polymer lens, and the like.

However, as illustrated in FIG. 1, the existing parabolic mirror 10 has a disadvantage in that an optical path is complicated and thus it is difficult to implement a small optical system.

Further, as illustrated in FIG. 2, it is known that the existing spherical and semi-spherical silicon lenses 20 have good transmittance in the mid-infrared and terahertz frequency regions, but there is a disadvantage in that the spherical and semi-spherical silicon lenses 20 are not easily machined due to characteristics of a crystalline silicon material and therefore are expensive and are not easily miniaturized.

Further, the existing spherical or semi-spherical polymer lens has a disadvantage in that high light absorption appears at a specific frequency, that is, the existing polymer lens used in a visible light region has a disadvantage in that since most polymers have an absorption peak in the mid-infrared and terahertz frequency regions, a specific bandwidth is lost.

FIG. 3 illustrates the existing gradient index lens which uses a conductive layer and a dielectric layer.

As illustrated in FIG. 3, a multilayer structure 12 has an array structure in which rectangular holes 14 and 16 are formed. In FIG. 3, a diameter of the left hole 14 is larger than that of the right hole 16 and the left hole 14 takes a shape in which a diameter is reduced toward the left. The array structure in which horizontal and vertical stripes 18 and 20 are formed between the holes is formed. Meanwhile, the multilayer structure 12 used as a substrate is formed of a multi structure having a shape in which a dielectric substance is sandwiched between the two conductive layers and thus is mainly used for focusing of visible light and IR. Further, since the multilayer structure includes the conductive layer, most region of the visible light and the IR is reflected or absorbed and thus a transmitting region is limited.

Therefore, there is a need to develop a new optical device capable of converging beams in the mid-infrared and terahertz regions by solving the disadvantage of the existing lenses as described above, but a lens or a method for manufacturing the lens meeting the conditions have not yet been suggested. Further, the array structure which has a simple structure and may perform effective focusing has not yet been suggested.

DISCLOSURE

Technical Problem

An object of the present invention is to provide a gradient index lens and a method for manufacturing the same capable of controlling an effective refractive index by forming a structure smaller than a wavelength on a substrate and being operated in mid-infrared and terahertz frequency regions based on the control.

That is, the present invention provides the gradient index lens using an effective medium theorem, that is, provides the gradient index lens using an effective refractive index of a microstructure and the method for manufacturing the same capable of controlling the effective refractive index through the structure smaller than the wavelength based on the effective medium theorem, providing the gradient to the refractive index in a radial direction and an axial direction, and converging the mid-infrared and terahertz wave based on the provided gradient.

Technical Solution

To achieve the above objects, according to an exemplary embodiment of the present invention, to control an effective refractive index in mid-infrared and terahertz frequency regions, there is provided a gradient index lens including a substrate and a microstructure pattern of a radial structure having a diameter smaller than a wavelength of a wave which is incident on the substrate and will be focused. The microstructures may be formed to have a diameter or an interval gradually increased or reduced radially from the center of the substrate.

Advantageous Effects

As described above, according to the exemplary embodiments of the present invention, the gradient index lens using an effective refractive index of a microstructure and the method for manufacturing the same capable of solving the disadvantage of the existing parabolic mirror which has the complicated optical path and is difficult to implement the small optical system may be provided.

Further, according to the exemplary embodiments of the present invention, the gradient index lens using an effective refractive index of a microstructure and the method for manufacturing the same capable of solving the disadvantage of the existing silicon lens which is difficult to be manufactured, is expensive, and has a limitation in miniaturization may be provided.

Further, according to the exemplary embodiments of the present invention, the gradient index lens using an effective refractive index of a microstructure and the method for manufacturing the same capable of solving the disadvantage of the existing polymer lens which has a specific bandwidth lost due to an absorption peak in the mid-infrared and terahertz frequency regions may be provided.

According to the exemplary embodiments of the present invention, a new gradient index lens using an effective refractive index of a microstructure and the method for manufacturing the same capable of solving the disadvantages of the existing lenses as described above, controlling the effective refractive index through the structure smaller than the wavelength based on the effective medium theorem, providing the gradient to the refractive index in the radial direction and the axial direction, and converging beams in the mid-infrared and terahertz frequency regions based on the provided gradient may be provided.

BEST MODE

Figure 1:
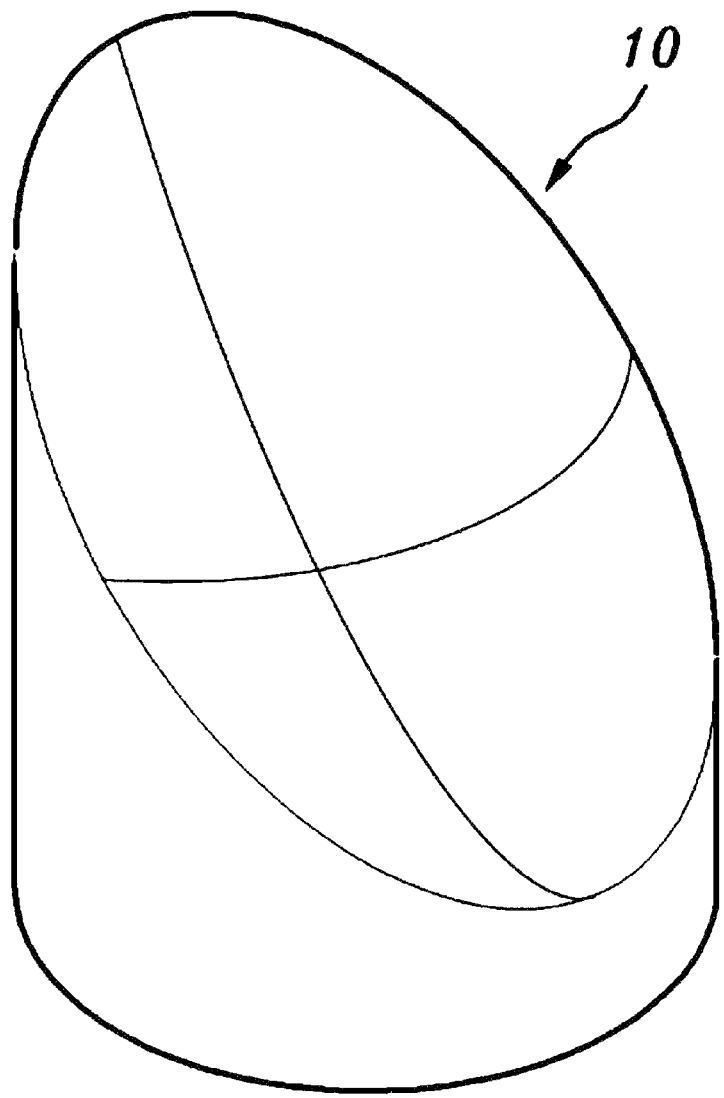
FIG. 1 is a diagram illustrating the existing parabolic mirror.
Figure 2:
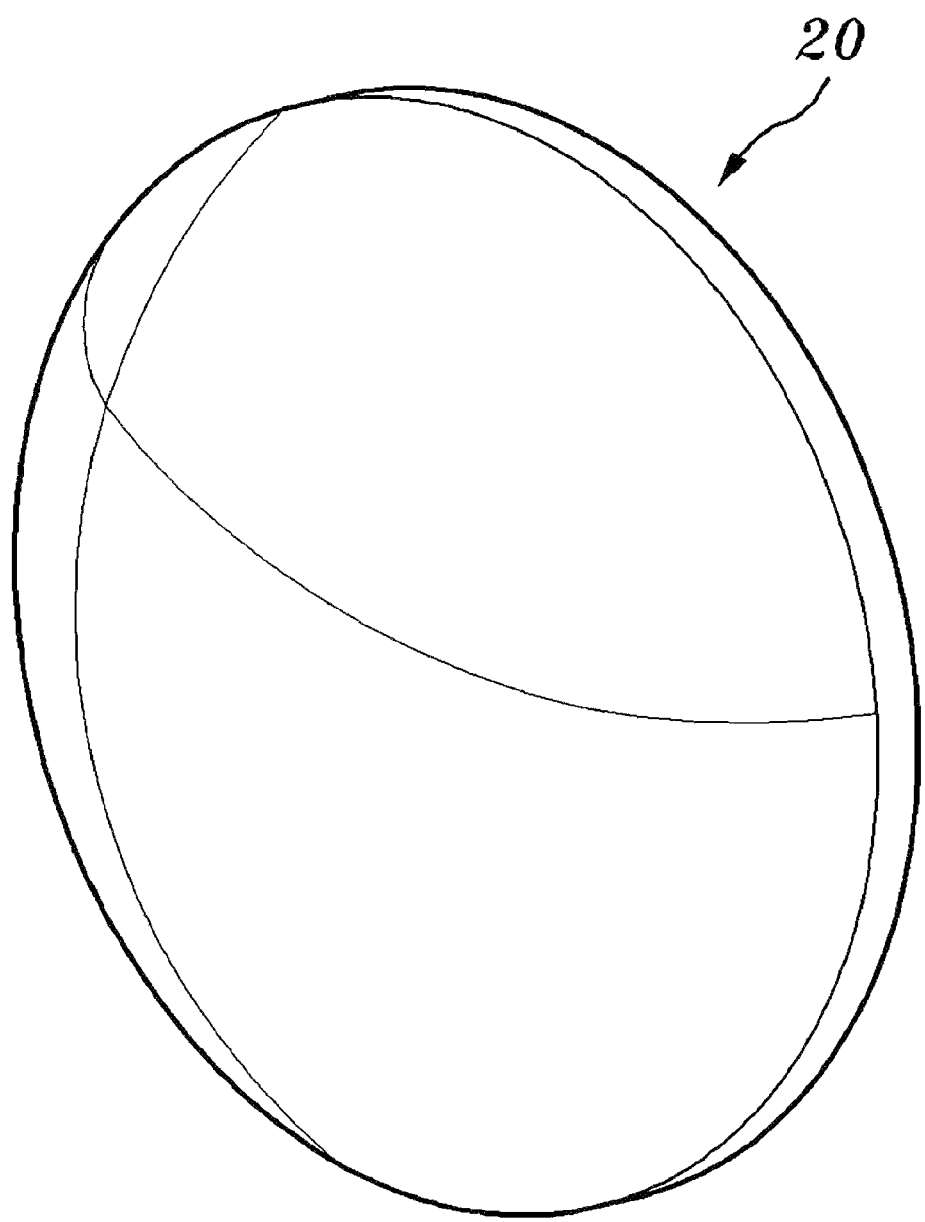
FIG. 2 is a diagram illustrating the existing silicon lens.
Figure 3:
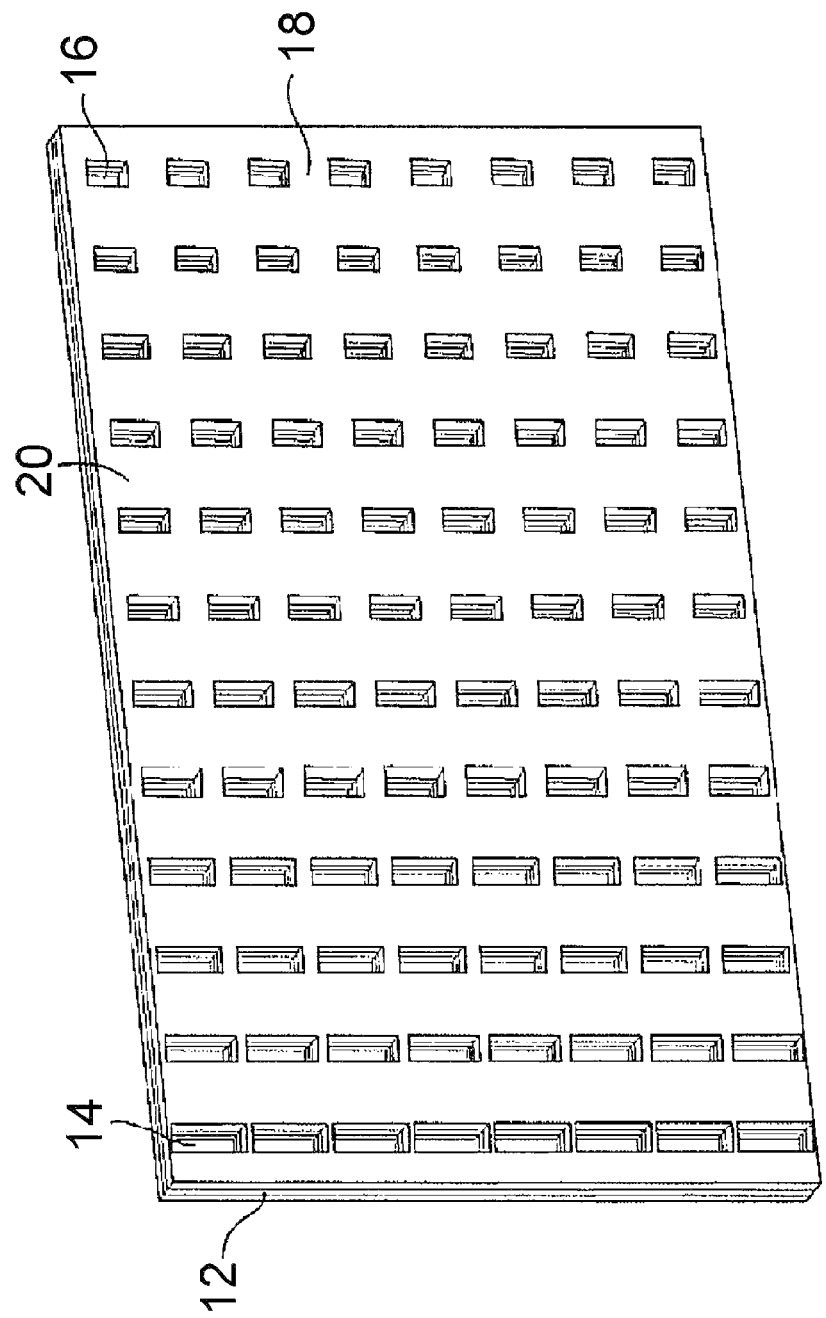
FIG. 3 is a diagram illustrating the existing gradient index lens having a multilayer structure.

Hereinafter, a gradient index lens using an effective refractive index of a microstructure and a method for manufacturing the same according to an exemplary embodiment of the present invention will be described with reference to the accompanying drawings.

The following description is only an example of the present invention and therefore it is to be noted that the present invention is not limited to contents of the following exemplary embodiments.

That is, the present invention generally relates to a gradient index lens using an effective refractive index of a microstructure operated for an electromagnetic wave having a wavelength of 3 μm to 3 mm and a method for manufacturing the same.

In more detail, as described below, the present invention is to solve a disadvantage of the existing parabolic mirror used to converge beams in a mid-infrared region and a terahertz frequency region which has a complicated optical path and is difficult to implement a small optical system, a disadvantage of the existing silicon lens which is difficult to be manufactured and thus is expensive, and a disadvantage of the existing polymer lens used in a visible light region which has a lost specific bandwidth since most polymers have an absorption peak in the corresponding region.

To this end, the present invention provides the gradient index lens using an effective refractive index of a microstructure and the method for manufacturing the same capable of controlling an effective refractive index through a structure smaller than a wavelength based on an effective medium theorem, providing the gradient to the refractive index in a radial direction and an axial direction, and converging mid-infrared and terahertz beams based on the provided gradient.

Further, in the following description, the term 'smaller than a wavelength' collectively represents all the cases in which a size of a structure needs to be smaller than a wavelength in order for an inhomogeneous structure to have homogeneous optical characteristics and wavelengths at which each lens is operated may be different and therefore the size of the structure having a size smaller than the wavelength of the mid-infrared and the terahertz wave may also be different.

That is, for example, in an optical region, in order for the structure to have the effective refractive index characteristics in connection with light having a wavelength of 10 μm, the size of the structure needs to be smaller than 10 μm and the wavelength 3 μm to 3 mm and therefore the structure of the 'smaller than a wavelength' used in the present invention may be a structure having a size from 3 μm to 3 mm.

Herein, since there are limitations in a process, considering the limitations, the structure of the 'smaller than a wavelength' substantially becomes a structure of 3 μm to 0.8 μm.

Further, in the present specification, the term 'effective refractive index has a gradient' means that a spatial difference in the effective refractive index in a structure having different sizes. That is, the present invention uses a phenomenon that light is refracted depending on the gradient due to the spatial difference in the effective refractive index.

To be continued, the gradient index lens using an effective refractive index of a microstructure and the method for manufacturing the same according to the exemplary embodiment of the present invention will be described with reference to the accompanying drawings.

Figure 4:
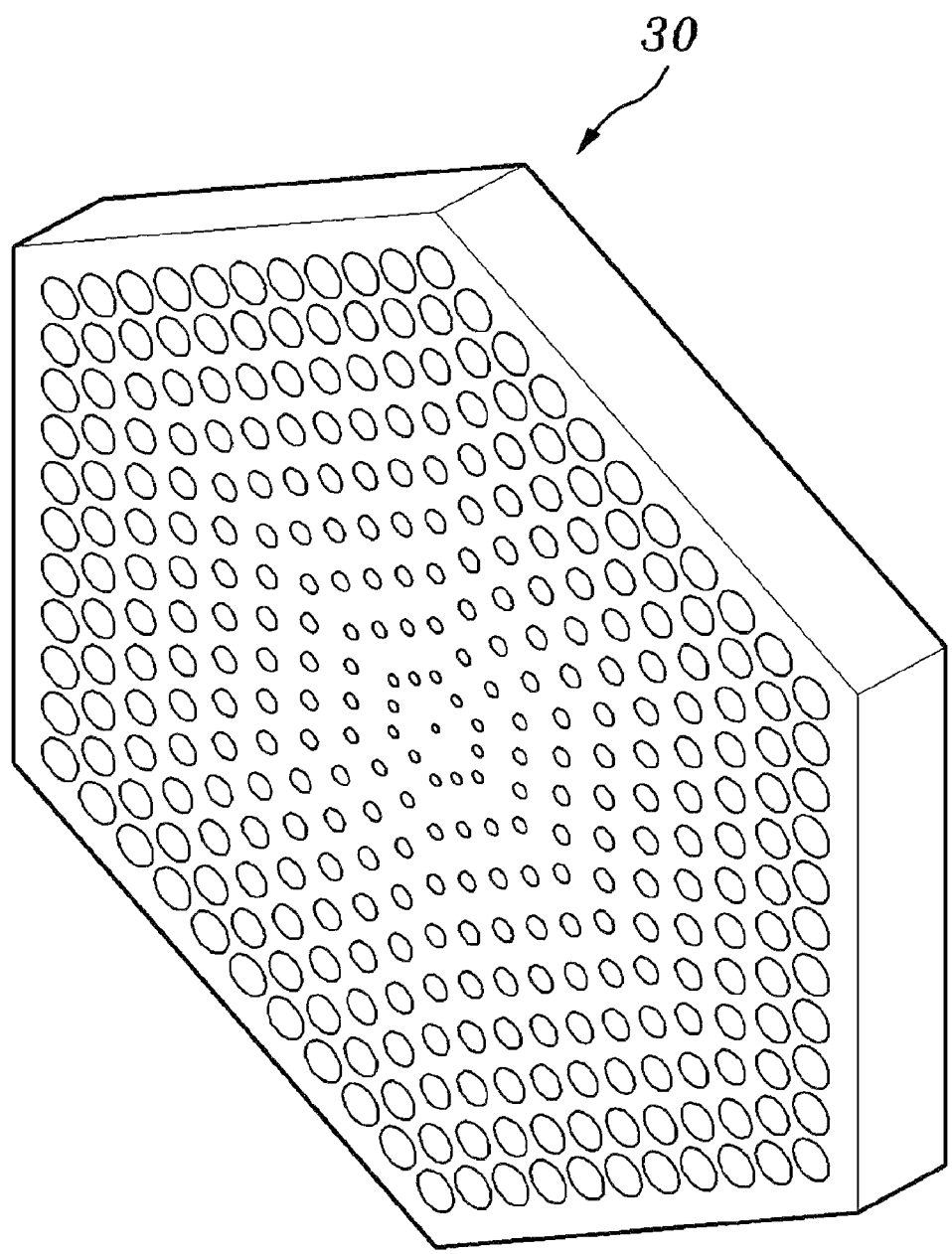
FIG. 4 is a diagram illustrating a form of a gradient index lens using an effective refractive index of a microstructure according to an exemplary embodiment of the present invention.

Referring first to FIG. 4, FIG. 4 is a diagram schematically illustrating a configuration of the gradient index lens using an effective refractive index of a microstructure according to the exemplary embodiment of the present invention.

Herein, the gradient index lens using an effective refractive index of a microstructure according to the exemplary embodiment of the present invention is configured to include a substrate having various types of structure to control the refractive index and in more detail, pillars or holes having a diameter smaller than a wavelength of the mid-infrared and terahertz wave are arrayed on the substrate and the effective refractive index has the gradient. The present exemplary embodiment describes an array of the microstructure in which the diameter of the hole is gradually increased, but according to the purpose, an array in which the diameter of the microstructure is gradually reduced is also possible.

The gradient index lens using an effective refractive index of a microstructure according to the exemplary embodiment of the present invention is configured to include a substrate 30 which has hexahedral lattice form and is provided with circular holes having the diameter smaller than the wavelength of the mid-infrared and terahertz wave by dry etch or wet etch.

Herein, the dry etch may use at least one of reactive ion etch, deep reactive ion etch, and plasma etch and the wet etch may use isotropic wet etch or anisotropic wet etch.

Figure 5:
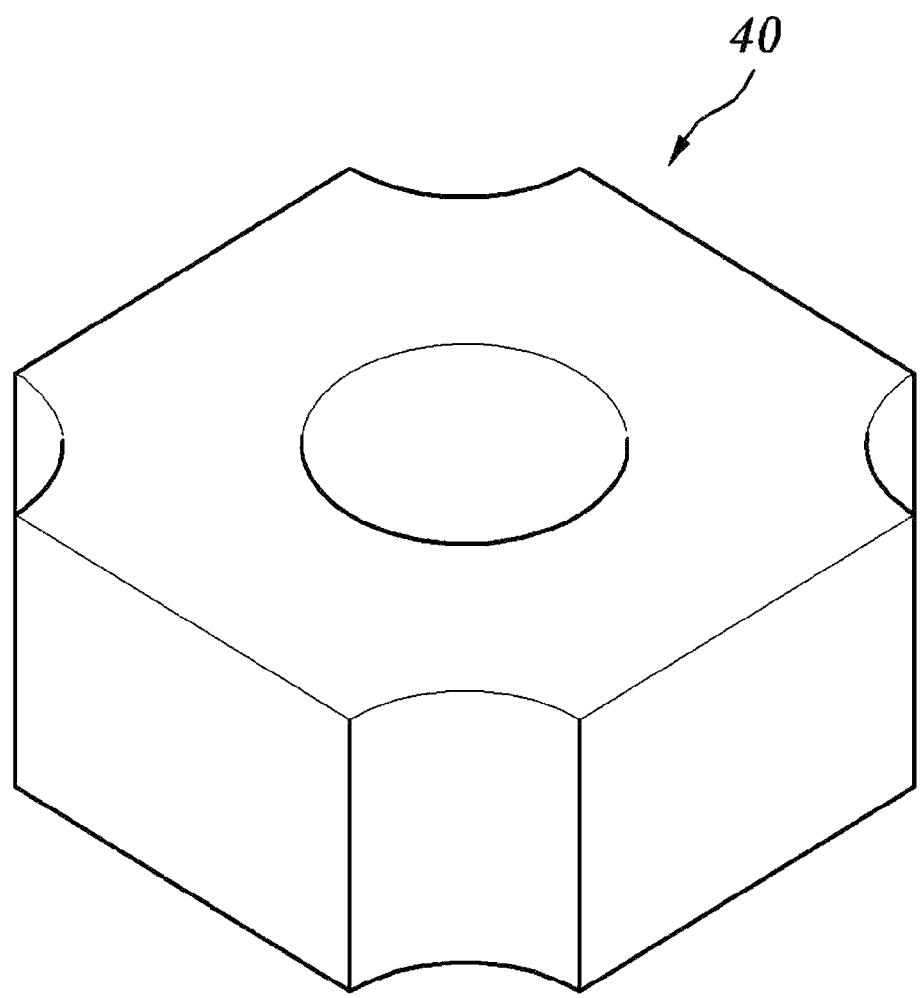
FIG. 5 is a diagram illustrating another form of the gradient index lens using an effective refractive index of a microstructure according to the exemplary embodiment of the present invention.

Further, the exemplary embodiment illustrated in FIG. 4 describes the form in which the circular holes are formed on the substrate 30 having the hexahedral lattice form, but as illustrated in FIG. 5, the substrate may be a substrate having the form in which quadrangular lattices 40 formed with the circular holes having the diameter smaller than the wavelength of the mid-infrared and terahertz wave are arrayed.

Further, the exemplary embodiment illustrated in FIGS. 4 and 5 describes an example in which the circular holes are formed in each lattice form but the present invention is not limited to the above form and therefore the substrate may also be formed in the form in which in addition to the circular holes as described above, holes having a polygonal shape or other composite shapes are formed.

Herein, the structure may be formed so that a vertical section thereof has one of a triangular shape, a quadrangular shape, a semi-circular shape, and a semi-oval shape and the shape, size, position, and number of holes or structures are variously formed to be smaller than the wavelength for the effective refractive index to be obtained.

Further, as the substrate, Si, GaAs, glass substrates, or the like may be used and a distribution of the refractive index depends on one of a parabolic equation, a multi-order equation, a square root of a multi-order equation, and sphere distributions in a surface direction and a depth direction.

Therefore, as described above, the gradient index lens using an effective refractive index of a microstructure according to the exemplary embodiment of the present invention forms the circular or polygonal pillars or the holes having the diameter smaller than the wavelength of the mid-infrared and terahertz wave on the substrate formed in the lattice form by the dry etch or the wet etch to provide the gradient to the effective refractive index according to the spatially change in the effective refractive index and refract light within the substrate to converge the mid-infrared and terahertz wave.

That is, the gradient index lens using an effective refractive index of a microstructure according to the exemplary embodiment of the present invention as described above uses the effective refractive index changing according to the form of the structure having the size smaller than the wavelength of the mid-infrared and terahertz wave to provide the spatial refractive index gradient and converge the mid-infrared and terahertz wave based on the gradient.

In more detail, for example, as illustrated in FIG. 4, considering the form in which the diameter of the circular holes constantly arrayed based on an original point is increased, due to the form, a high refractive index may be formed at the original point and a low refractive index may be formed at an outside portion and the velocity of light is different depending on the difference in the refractive index, such that a light ray is refracted to a portion having the high refractive index.

Therefore, the gradient index lens using an effective refractive index of a microstructure according to the exemplary embodiment of the present invention may converge the mid-infrared and terahertz wave based on the principle as described above.

Figure 6:
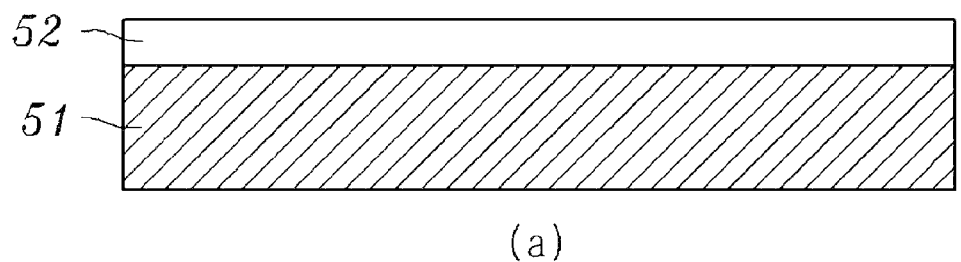
FIG. 6 is a diagram illustrating each step of a method for manufacturing a gradient index lens using an effective refractive index of a microstructure according to an exemplary embodiment of the present invention.
Figure 6:
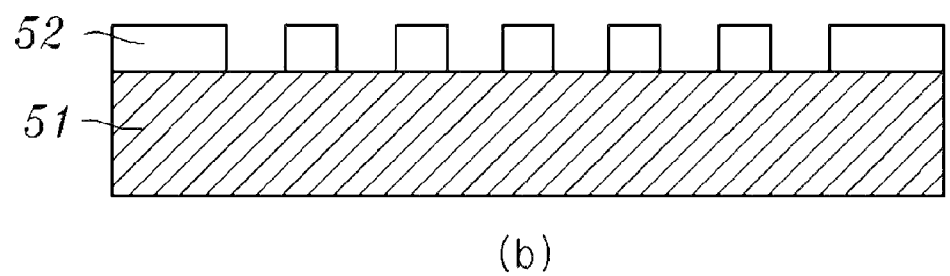
Figure 6:
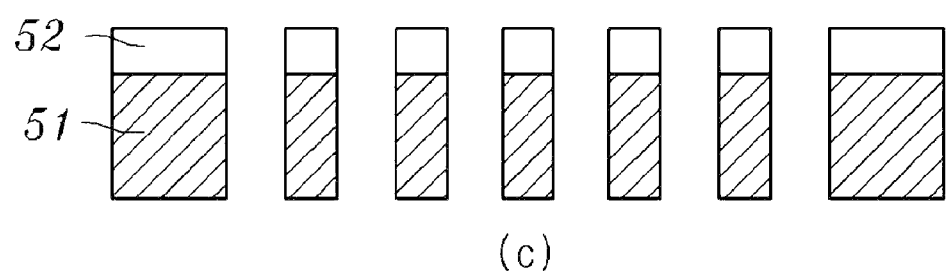
Figure 6:
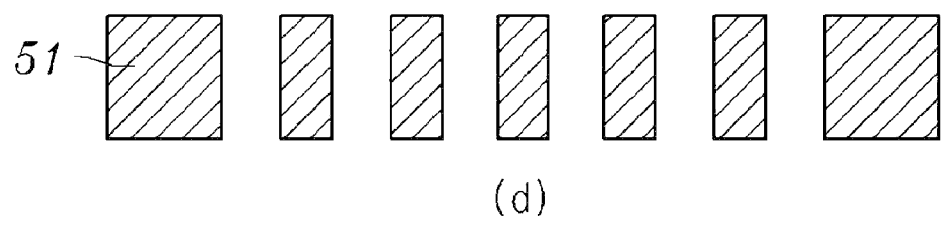

To be continued, a method for manufacturing a gradient index lens using an effective refractive index of a microstructure according to the exemplary embodiment of the present invention as described above will be described with reference to FIG. 6.

That is, referring to FIG. 6, FIGS. 6A to 6D are diagrams illustrating each step of the method for manufacturing a gradient index lens using an effective refractive index of a microstructure according to the exemplary embodiment of the present invention.

In more detail, first, as illustrated in FIG. 6A, a mask layer 52 is formed on a substrate 51 and then as illustrated in FIG. 6B, the formed mask layer 52 is patterned in a desired pattern.

Next, as illustrated in FIG. 6C, the substrate 51 is patterned according to a pattern formed on the mask layer 52 and as described above, the patterning of the substrate 51 is a step of forming the circular or polygonal holes or structures having the diameter smaller than the wavelength of the mid-infrared and terahertz wave using the dry etch or the wet etch.

Next, as illustrated in FIG. 6D, the gradient index lens using an effective refractive index of a microstructure according to an exemplary embodiment of the present invention may be manufactured by removing the remaining mask layer 52.

Alternatively, by using the substrate-type gradient index lens as described above with reference to FIGS. 4 and 5 as a master substrate, the polymer is injected into the master substrate, the injected polymer is hardened, and then the hardened polymer is separated from the substrate, thereby manufacturing the gradient index lens using an effective refractive index of a microstructure capable of converging the mid-infrared and terahertz wave.

Figure 7:
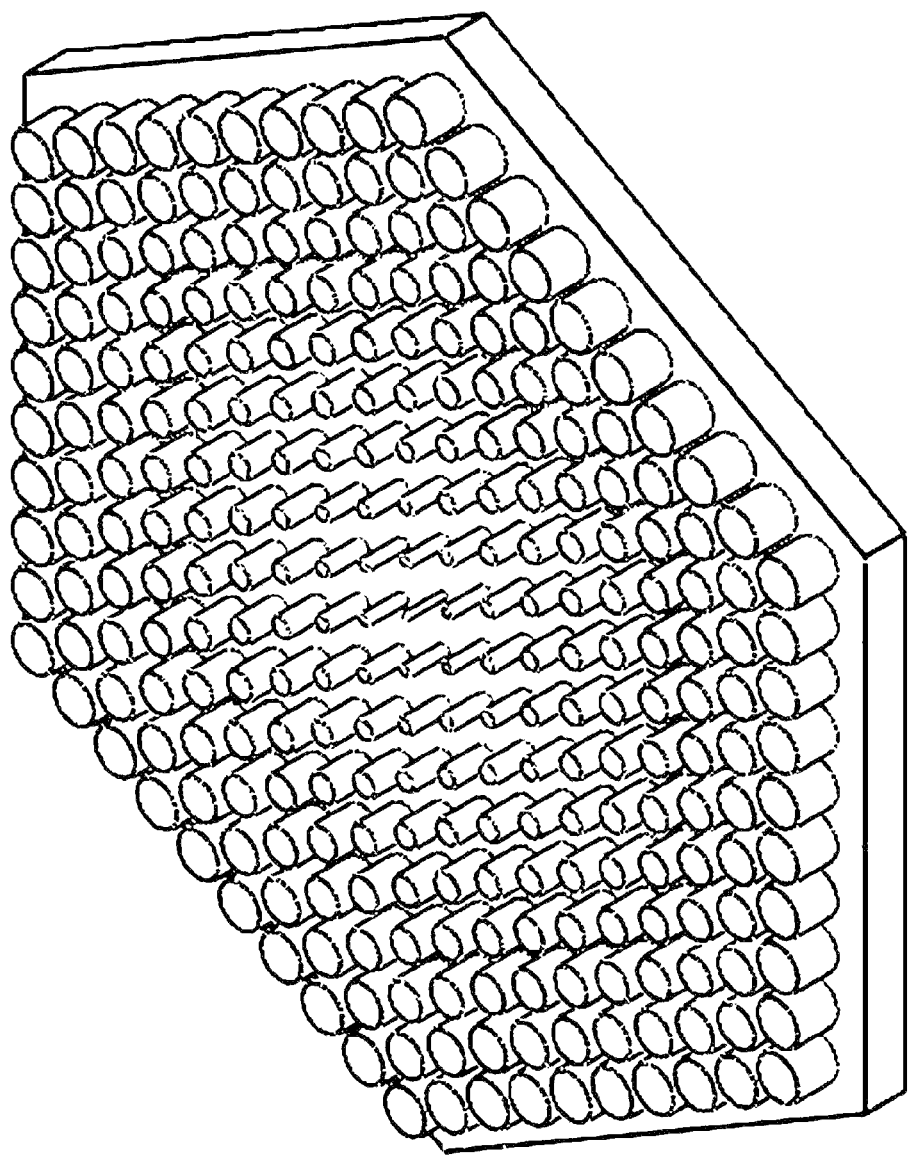
FIG. 7 is a diagram illustrating a form of a gradient index lens using an effective refractive index of a microstructure according to another exemplary embodiment of the present invention.

FIG. 7 illustrates as a gradient index lens using an effective refractive index of a microstructure according to another exemplary embodiment of the present invention, in which a lens is formed with a pillar-shaped microstructure instead of the hole according to the exemplary embodiment of the present invention. The circular or polygonal pillar having the diameter smaller than the wavelength of the mid-infrared and terahertz wave may be also used.

Using the gradient index lens using an effective refractive index of a microstructure according to the exemplary embodiment of the present invention manufactured as described above, the disadvantage of the existing parabolic mirror which has the complicated optical path and is difficult to implement the small optical system, the disadvantage of the existing silicon lens which is difficult to be manufactured and thus is expensive, and the disadvantage of the existing polymer lens which has the lost specific bandwidth in the mid-infrared and terahertz frequency regions may be solved.

Hereinabove, the exemplary embodiments of the present invention describe in detail the gradient index lens using an effective refractive index of a microstructure and the method for manufacturing the same, but the present invention is not limited to the contents of the foregoing exemplary embodiments and therefore the present invention may be variously modified, changed, combined, and replaced according to a necessity of design and other various factors by a person having ordinary skill in the art to which the present invention pertains.

INDUSTRIAL APPLICABILITY

The present invention may be applied to the gradient index lens using an effective refractive index of a microstructure.

The invention claimed is:

1. A gradient index lens using an effective refractive index of a microstructure converging an electromagnetic wave from mid-infrared to terahertz wave, comprising:
   a flat plate type substrate consisting of Si or GaAs and having a predetermined thickness; and
   microstructures formed in the substrate to control an effective refractive index of the flat plate type substrate,
   wherein the microstructures include through-holes arranged in the substrate, the through-holes having a circular shape, a polygonal shape, or a composite shape, the through-holes having a diameter smaller than a wavelength of the electromagnetic wave,
   wherein each of the through-holes does not enclose one another, and
   wherein the diameter of the through-holes or an interval therebetween is gradually increased or reduced radially from a center of the substrate such that the refractive index of the microstructure gradually changes radially from the center of the substrate.

2. The gradient index lens of claim 1, wherein the substrate is a single dielectric substrate.

3. The gradient index lens of claim 1, wherein the microstructure is a structure that is formed by dry etch or wet etch.

4. The gradient index lens of claim 1, wherein the microstructure is arrayed so that a distribution of refractive index of the substrate has one of parabolic equation, multi-order equation, square root of a multi-order equation, and sphere distributions, in a surface direction and a depth direction.

5. A method for manufacturing a gradient index lens using an effective refractive index of a microstructure converging an electromagnetic wave from mid-infrared to terahertz wave, the method comprising:
providing a flat plate type master substrate consisting of Si or GaAs;
forming a mask layer on the master substrate;
forming an etch pattern for forming the microstructure having a diameter smaller than a wavelength of the electromagnetic wave on the mask layer;
etching the substrate using the patterned mask layer as an etch mask;
removing the remaining mask layer;
injecting a polymer into the etched substrate;
hardening the injected polymer; and
separating the hardened polymer from the etched substrate to form a polymer lens in which the microstructure is formed,
wherein in the forming of the etch pattern of the microstructure, the etch pattern is formed so that through-holes having a circular shape, a polygonal shape, or a composite shape are arranged in the substrate, the through-holes having a diameter being smaller than the wavelength of the electromagnetic wave,
wherein each of the through-holes does not enclose one another, and
wherein the diameter of the through-holes or an interval therebetween is gradually increased or reduced radially from a center of the substrate such that the refractive index of the microstructure gradually changes radially from the center of the substrate.

6. The method of claim 5, wherein in the etching of the substrate, the substrate is etched by dry etch or wet etch.

7. The method of claim 6, wherein the dry etch uses at least one of reactive ion etch, deep reactive ion etch, and plasma etch.

8. The method of claim 6, wherein the wet etch uses isotropic wet etch or anisotropic wet etch.

9. The method of claim 5, wherein the microstructure is arrayed so that a distribution of refractive index of the substrate has one of parabolic equation, multi-order equation, square root of a multi-order equation, and sphere distributions, in a surface direction and a depth direction.

10. The gradient index lens of claim 1, wherein the electromagnetic wave travels parallel to the direction to which the through-holes are extended such that the electromagnetic wave is converged.

11. The method of claim 5, wherein the electromagnetic wave travels parallel to the direction to which the through-holes are extended such that the electromagnetic wave is converged.

* * * * *